No. 841,659. PATENTED JAN. 22, 1907.
N. W. BAECHLE.
FRICTION CLUTCH.
APPLICATION FILED MAR. 23, 1906.

3 SHEETS—SHEET 1.

Witnesses

Inventor
Nicholas W. Baechle
By Parkinson & Richards
Attorneys

No. 841,659. PATENTED JAN. 22, 1907.
N. W. BAECHLE.
FRICTION CLUTCH.
APPLICATION FILED MAR. 23, 1906.

3 SHEETS—SHEET 2.

Witnesses

Inventor
Nicholas W. Baechle
By Parkinson + Richards
Attorneys

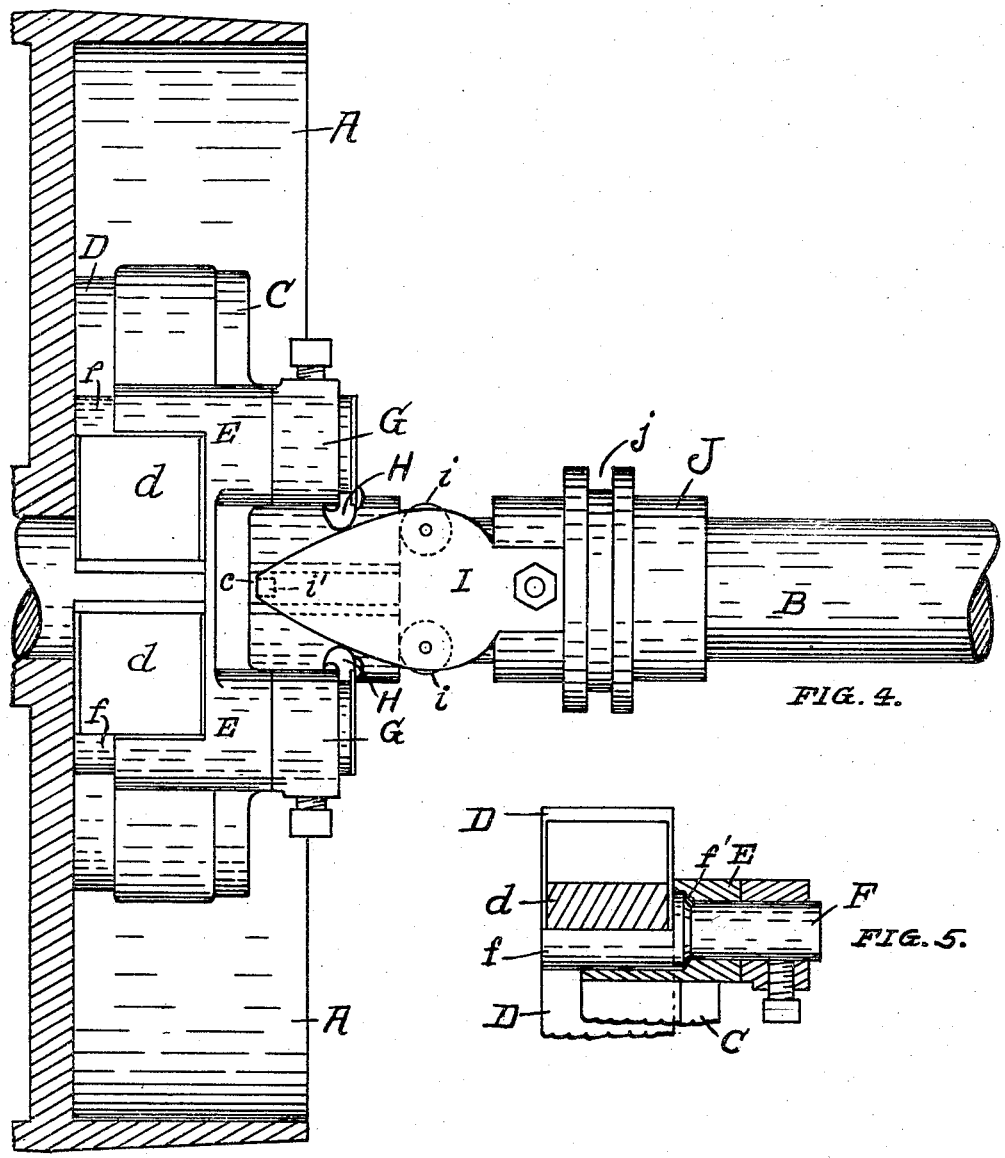

UNITED STATES PATENT OFFICE.

NICHOLAS W. BAECHLE, OF CINCINNATI, OHIO.

FRICTION-CLUTCH.

No. 841,659.　　　　　Specification of Letters Patent.　　　　Patented Jan. 22, 1907.

Application filed March 23, 1906. Serial No. 307,580.

*To all whom it may concern:*

Be it known that I, NICHOLAS W. BAECHLE, a citizen of the United States, residing at Cincinnati, in the county of Hamilton and State of Ohio, have invented certain new and useful Improvements in Friction-Clutches, of which the following is a specification.

The object of my invention is to provide a friction-clutch of improved construction and operation; and my invention consists in the combination and arrangement of parts hereinafter described and claimed.

Figure 1:
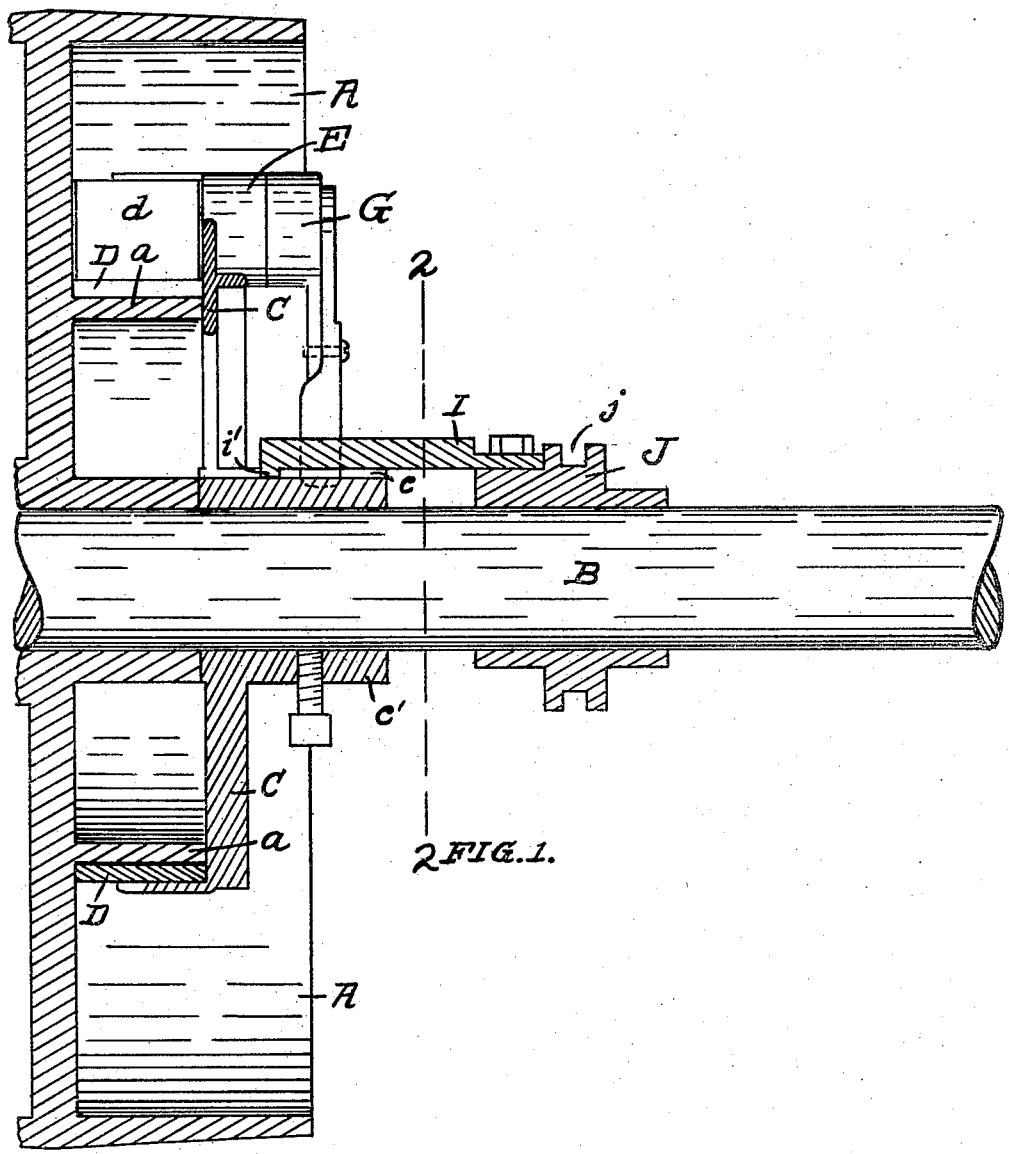
Figure 2:
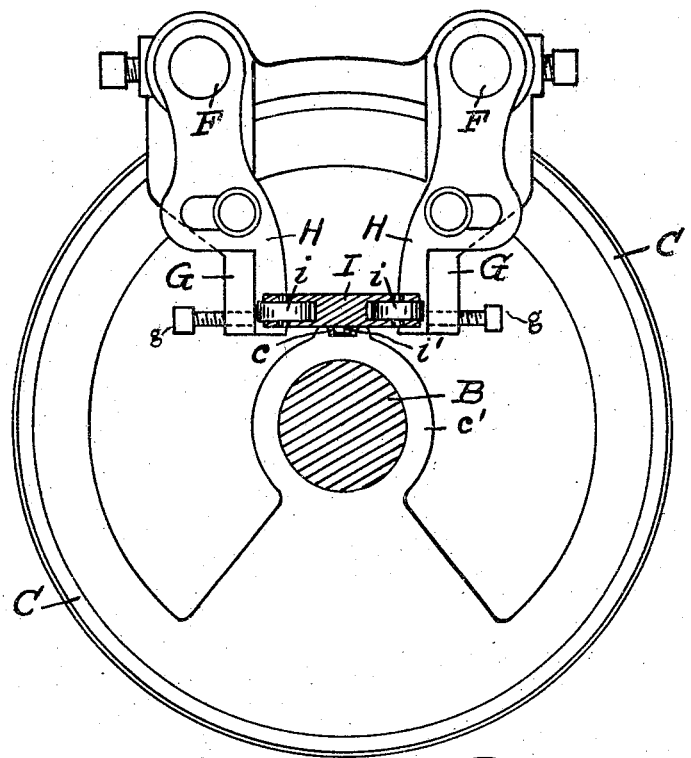
Figure 3:
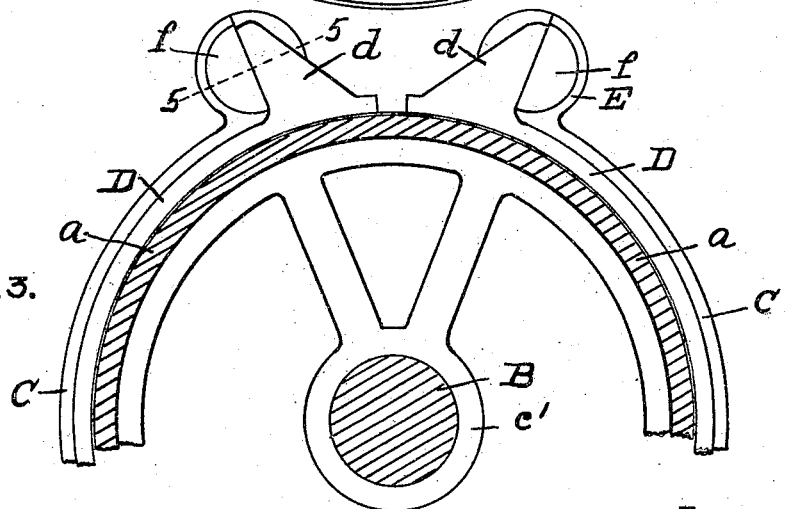

In the drawings, Figure 1 is a vertical section of a clutch embodying my invention; Fig. 2, a section on line 2 2 of Fig. 1, the pulley not being shown; Fig. 3, a partial elevation of the inner side of the clutch; Fig. 4, a top plan view, partially in section; and Fig. 5 a section on line 5 5 of Fig. 3.

A suitable pulley A is rotatably mounted on shaft B and carries an annular friction-flange $a$. To shaft B is secured a suitable casing C, the outer part of which encompasses the flange $a$. A loose friction-ring D, having lugs $d$ near its ends, is placed within casing C with the lugs $d$ projecting radially through a suitable opening in the casing. The encompassing surface of casing C is turned concentrically with shaft B, and the ring D is of such size as to be slightly sprung inwardly when placed in position within the casing, where the tension in the ring normally holds it out against the casing and gives a uniform clearance from the flange $a$. Bearing-lugs E are formed on either side of the casing-opening, and shafts F, having flattened ends $f$, bearing on lugs $d$, mounted therein. The shafts F are provided with shoulders $f'$ and the bearings in lugs E shaped to correspond, thus preventing longitudinal movement of the shaft in one direction. The shoulder $f'$ is formed a short distance from the termination of the flattened portion of the shaft, thus leaving the full strength of the larger end of the shaft to transmit the strain from the smaller portion to the flattened end. Operating-arms G are secured to the ends of shafts F and, bearing against lugs E, prevent movement of the shafts in the other direction. The arms G carry adjustable contact-pieces H, adapted to contact with the sides of the operating-nose I, which passes between the arms. In the form illustrated the contact-pieces are pivoted on shaft F. Taking through the inner ends of operating-arms G are screws $g$, the inner ends of which bear against the inner ends of the contact-pieces. By turning the screws in or out the distance between the points of contact, and consequently the throw of the operating-arms, may be increased or diminished. Friction-rollers $i$ are mounted in the sides of nose I to project from the sides thereof at its widest point. At its inner end nose I carries a guide-lug $i'$, loosely fitting in a channel $c$ in the hub $c'$ of casing C. The nose I is carried by a shiftable hub J, having an annular groove $j$, adapted to be engaged by the usual prong for this purpose.

The bearing-faces of the lugs $d$ are at an angle to each other, with the apex of the angle toward the hub, and the angle is sufficient to cause the bearing-surfaces to ride outwardly relatively to the bearing-faces of the operating-shafts F when the latter are actuated to throw the clutch into engagement. By this outward movement the part of the ring immediately opposite the gap is first brought into contact with the friction-rim, while the ring ends are held out of contact, so that the initial contact is at the point most remote from the point of application of the power, and the parts of the ring between the point opposite the gap and the gap gradually close in as the grip increases, thus insuring uniform contact throughout the entire length of the ring.

In use, when frictional juncture is desired between the pulley A and shaft B the nose I is forced between arms G to spread them apart. This rotates shafts F toward each other, and their flattened ends bearing on lugs $d$ force the ends of ring D together to apply the ring to the flange $a$.

It will be seen that the operative bearing of the flattened shaft ends on lugs $d$ is a line bearing, and as the rotation of the shaft carries the bearing edge inwardly there is substantially no sliding action between the shaft edge and lug to cause frictional wear. The relative arrangement of the parts is such that when the arms G have nearly reached their limit of outward movement the contact-pieces H pass onto rollers $i$, so that the final movement thereof is caused by the rolling movement of rollers $i$, thus greatly alleviating the friction at the moment of greatest strain. The inward movement of nose I is continued until the contact-pieces pass slightly beyond the plane of greatest projection of the rollers, in which position the rollers serve to lock the nose against withdrawal. Owing to the fact that when the force is applied to the ends of ring D it is free to adjust itself to flange a in any direction and that the nose I also is free to adjust itself angularly, uniform and accurate contact is always obtained between the ring and flange. The capacity for angular movement by nose I will also automatically compensate for any defects in the adjustment of contact-pieces H. The flattened ends $f$ of shaft F are supported by bearings directly behind their lines of application to lugs D, so that no bending strain is introduced in said shafts.

It will be noted that this clutch is composed of a very few parts of simple construction, which may be readily assembled and taken apart. A distinct advantage of the construction is that the bearings for shaft F may be made upon a drill-press, which is simple and economical of operation.

In the drawings I have illustrated my invention as applied to an external friction-ring; but it is obvious that the invention may be applied to an internal friction-ring with the same advantages.

While I have illustrated and described the preferred construction for carrying my invention into effect, this is capable of modification without departing from the spirit of the invention. I therefore do not wish to be limited to the exact construction set forth; but

What I claim as new, and desire to secure by Letters Patent, is—

1. In a friction-clutch, the combination of a friction-rim; a friction-ring adapted to contact therewith and free to move radially and circumferentially; means for applying force to both ends of the ring; and means for actuating the ring-operating means, said means being movable toward either ring-operating means, and away from the other, substantially as specified.

2. In a friction-clutch, the combination of a friction-rim; a friction-ring adapted to contact therewith; shafts provided with arms; means on the shafts for applying force to both ends of the ring; and means for actuating the shaft-arms, said means being adjustable toward either shaft-arm and away from the other, substantially as specified.

3. In a friction-clutch, the combination of a friction-rim; a friction-ring adapted to contact therewith and free to move radially and circumferentially; shafts provided with arms; means on the shafts for applying force to both ends of the ring; and common means for actuating the shaft-arms, said means being adjustable toward either shaft-arm and away from the other, substantially as specified.

4. In a friction-clutch, the combination of a friction-rim; a friction-ring adapted to contact therewith and free to move radially and circumferentially; lugs on the ends of the ring; shafts carrying operative means adapted to contact with the lugs; arms on the shafts; and means for actuating the arms to force the ring into engagement with the friction-surface, substantially as specified.

5. In a friction-clutch, the combination of a friction-rim; a loose friction-ring adapted to contact therewith; lugs on the ends of the ring having bearing-surfaces inclined toward each other; and means for applying force to the lugs simultaneously to force them upwardly and inwardly, substantially as specified.

6. In a friction-clutch, the combination of a friction-rim; a loose friction-ring adapted to contact therewith; lugs on the ends of the ring; shafts carrying operative means adapted to contact with the lugs; arms on the shafts; and a nose for actuating the arms to force the ring into engagement with the friction-surface, substantially as specified.

7. In a friction-clutch, the combination of a friction-rim; a friction-ring adapted to contact therewith; lugs on the ends of the ring; shafts carrying operative means adapted to contact with the lugs; arms on the shafts; and a nose for actuating the arms to force the ring into engagement with the friction-surface, the nose being free to move laterally relatively to either arm, substantially as specified.

8. In a friction-clutch, the combination of a friction-rim; a friction-ring adapted to contact therewith; lugs on the ends of the ring; shafts carrying operative means adapted to contact with the lugs; arms on the shafts; and a nose, carrying friction-rollers, for actuating the arms to force the ring into engagement with the friction-surface, substantially as specified.

9. In a friction-clutch, the combination of a friction-rim; a friction loose ring adapted to contact therewith; lugs on the ends of the ring; shafts having flattened ends adapted to bear on the lugs; operative arms on the shafts; and means for operating the arms, substantially as specified.

10. In a friction-clutch, the combination of a friction-rim; a friction loose ring adapted to contact therewith; lugs on the ends of the ring; shafts having flattened ends adapted to bear on the lugs; operative arms on the shafts; and a nose for operating the arms, substantially as specified.

11. In a friction-clutch, the combination of a friction-rim; a friction-ring adapted to contact therewith; lugs on the ends of the ring; shafts having flattened ends adapted to bear on the lugs; operative arms on the shafts; and a nose carrying antifriction-rollers, for operating the arms, substantially as specified.

12. In a friction-clutch, the combination of pulley A carrying friction-flange $a$; casing C encompassing flange $a$; friction-ring D supported by the casing and adapted to contact with flange a; bearings E on casing C; shafts F in bearings E and having operative connections with the ends of rings D; and means for operating shafts F, substantially as specified.

13. In a friction-clutch, the combination of pulley A carrying annular friction-flange a; casing C encompassing flange a; friction-ring D having lugs d on its ends; shafts F mounted in bearings E on casing C and having flattened ends f contacting with lugs d; and means for operating shafts F, substantially as specified.

14. In a friction-clutch, the combination of pulley A carrying annular friction-flange a; casing C encompassing flange a; friction-ring D having lugs d on its ends; shafts F mounted in bearings E on casing C and having flattened ends f contacting with lugs d; arms C on shafts F; and nose I, carrying rollers i, for operating arms G, substantially as specified.

15. As a means for operating friction-clutches, a friction-ring, a shaft having a larger flattened portion adapted to bear on the ring and a smaller portion adapted to carry the operative means; and a strengthening-shoulder between the two portions of the shaft, substantially as specified.

NICHOLAS W. BAECHLE.

Witnesses:
AGNES B. GRANT,
BRAYTON G. RICHARDS.